United States Patent
Alapati et al.

(10) Patent No.: US 10,223,755 B2
(45) Date of Patent: Mar. 5, 2019

(54) AUGMENTED REALITY RETAIL SYSTEM

(71) Applicant: AT&T Intellectual Property I, L.P., Atlanta, GA (US)

(72) Inventors: Venkata Satya Satish Alapati, Cumming, GA (US); Guy Bevente, Wayne, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 763 days.

(21) Appl. No.: 13/862,217

(22) Filed: Apr. 12, 2013

(65) Prior Publication Data

US 2014/0310056 A1 Oct. 16, 2014

(51) Int. Cl.

| G06Q 50/00 | (2012.01) |
|---|---|
| G06Q 30/02 | (2012.01) |
| G06K 9/00 | (2006.01) |
| G06Q 30/06 | (2012.01) |
| G06T 19/00 | (2011.01) |

(52) U.S. Cl.
CPC ......... G06Q 50/01 (2013.01); G06K 9/00671 (2013.01); G06Q 30/0201 (2013.01); G06Q 30/0641 (2013.01); G06T 19/006 (2013.01)

(58) Field of Classification Search
None
See application file for complete search history.

(56) References Cited

U.S. PATENT DOCUMENTS

| 8,606,645 | B1* | 12/2013 | Applefeld | G06Q 30/02 |
| | | | | 705/14.25 |
| 9,066,200 | B1* | 6/2015 | Loxam | H04N 5/232 |
| 2009/0070219 | A1* | 3/2009 | D'Angelo | G06Q 10/10 |
| | | | | 705/14.56 |
| 2009/0106040 | A1* | 4/2009 | Jones | G06Q 50/01 |
| | | | | 705/319 |
| 2009/0171686 | A1* | 7/2009 | Eberstadt | 705/1 |
| 2009/0285483 | A1* | 11/2009 | Guven et al. | 382/181 |
| 2010/0023878 | A1* | 1/2010 | Douris | H04L 12/6418 |
| | | | | 715/757 |
| 2010/0265311 | A1* | 10/2010 | Carpenter, Jr. | G06Q 10/00 |
| | | | | 348/14.08 |
| 2010/0325563 | A1* | 12/2010 | Goldthwaite | G06F 3/04815 |
| | | | | 715/757 |
| 2012/0004956 | A1* | 1/2012 | Huston | G06Q 30/0207 |
| | | | | 705/14.1 |
| 2012/0030032 | A1* | 2/2012 | Zurada | 705/14.66 |

(Continued)

OTHER PUBLICATIONS

Jara, "Marketing 4.0: A new value added to the Marketing through the Internet of Things," 2012, Sixth International Conference on Innovative Mobile and Internet Services in Ubiquitous Computing (IMIS), pp. 852-857.*

(Continued)

*Primary Examiner* — Ivan R Goldberg

(57) ABSTRACT

Methods, computer-readable media and apparatuses for providing additional information are disclosed. For example, a method receives from a device of a customer, an identification code identifying a product, obtains social media information regarding the customer from a social network, and provides the additional information to the device of the customer, wherein the additional information relates to the product, and wherein the additional information is based upon the social media information.

20 Claims, 5 Drawing Sheets

(56) References Cited

U.S. PATENT DOCUMENTS

| | | | | |
|---|---|---|---|---|
| 2012/0062595 | A1* | 3/2012 | Oh | G06K 9/00671 |
| | | | | 345/633 |
| 2012/0062596 | A1* | 3/2012 | Bedi | G06Q 30/0256 |
| | | | | 345/633 |
| 2012/0130821 | A1* | 5/2012 | Frankel | G06Q 30/0271 |
| | | | | 705/14.67 |
| 2012/0229657 | A1* | 9/2012 | Calman | G06Q 50/01 |
| | | | | 348/207.1 |
| 2012/0259744 | A1* | 10/2012 | Ganesh et al. | 705/27.2 |
| 2012/0299961 | A1* | 11/2012 | Ramkumar | G06F 17/30047 |
| | | | | 345/632 |
| 2013/0030950 | A1* | 1/2013 | Leng | G06Q 50/01 |
| | | | | 705/26.7 |
| 2013/0044128 | A1* | 2/2013 | Liu | G09G 5/00 |
| | | | | 345/633 |
| 2013/0073371 | A1* | 3/2013 | Bosworth | G06Q 30/02 |
| | | | | 705/14.35 |
| 2013/0073568 | A1* | 3/2013 | Federov et al. | 707/749 |
| 2013/0114864 | A1* | 5/2013 | Garcia | H04N 7/173 |
| | | | | 382/118 |
| 2013/0124326 | A1* | 5/2013 | Huang | G06Q 30/0255 |
| | | | | 705/14.64 |
| 2013/0218721 | A1* | 8/2013 | Borhan | G06Q 20/322 |
| | | | | 705/26.41 |
| 2014/0201024 | A1* | 7/2014 | Collier | G06Q 30/0621 |
| | | | | 705/26.5 |

OTHER PUBLICATIONS

Ajanki, "Contextual Information Access with Augmented Reality," 2010 IEEE International Workshop on Machine Learning for Signal Processing (MLSP), pp. 95-100.*

* cited by examiner

AUGMENTED REALITY RETAIL SYSTEM

The present disclosure relates generally to a method and apparatus for providing in-store shopping experiences, e.g., leveraging social media information to personalize and enhance such experiences.

BACKGROUND

In order to gain insight into customers' behaviors while in a store, as well as to gather information on their motivations, retailers typically must engage each customer, e.g., by a sales representative, to inquire about the customer's interests, to answer any questions that each customer may have and so forth. One goal is to induce the customer to make a purchase, ideally with a product that will satisfy the customer such that the customer will recommend the product, will recommend the retailer and will return to the retailer for future needs. However, creating this typical retail experience and environment is labor intensive. For example, it requires a large number of sales representatives at each store. In addition, many customers may become frustrated in various situations, e.g., due to an insufficient number of employees and a large number of customers, such as during the holiday shopping season. In another scenario, customers may prefer to shop without a sales person following them due to the feeling of being pressured to make a purchase.

SUMMARY

Embodiments of the present disclosure disclose methods, computer-readable media and apparatuses for providing additional information. For example, in one embodiment a method receives from a device of a customer, an identification code identifying a product, obtains social media information regarding the customer from a social network, and provides the additional information to the device of the customer, wherein the additional information relates to the product, and wherein the additional information is based upon the social media information.

In another embodiment, a computer-readable medium stores instructions which, when executed, cause a processor to perform operations that include: receiving from a device of a customer, an identification code identifying a product, obtaining social media information regarding the customer from a social network, and providing the additional information to the device of the customer, wherein the additional information relates to the product, and wherein the additional information is based upon the social media information.

In still another embodiment, an apparatus receives from a device of a customer, an identification code identifying a product, obtains social media information regarding the customer from a social network, and provides the additional information to the device of the customer, wherein the additional information relates to the product, and wherein the additional information is based upon the social media information.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
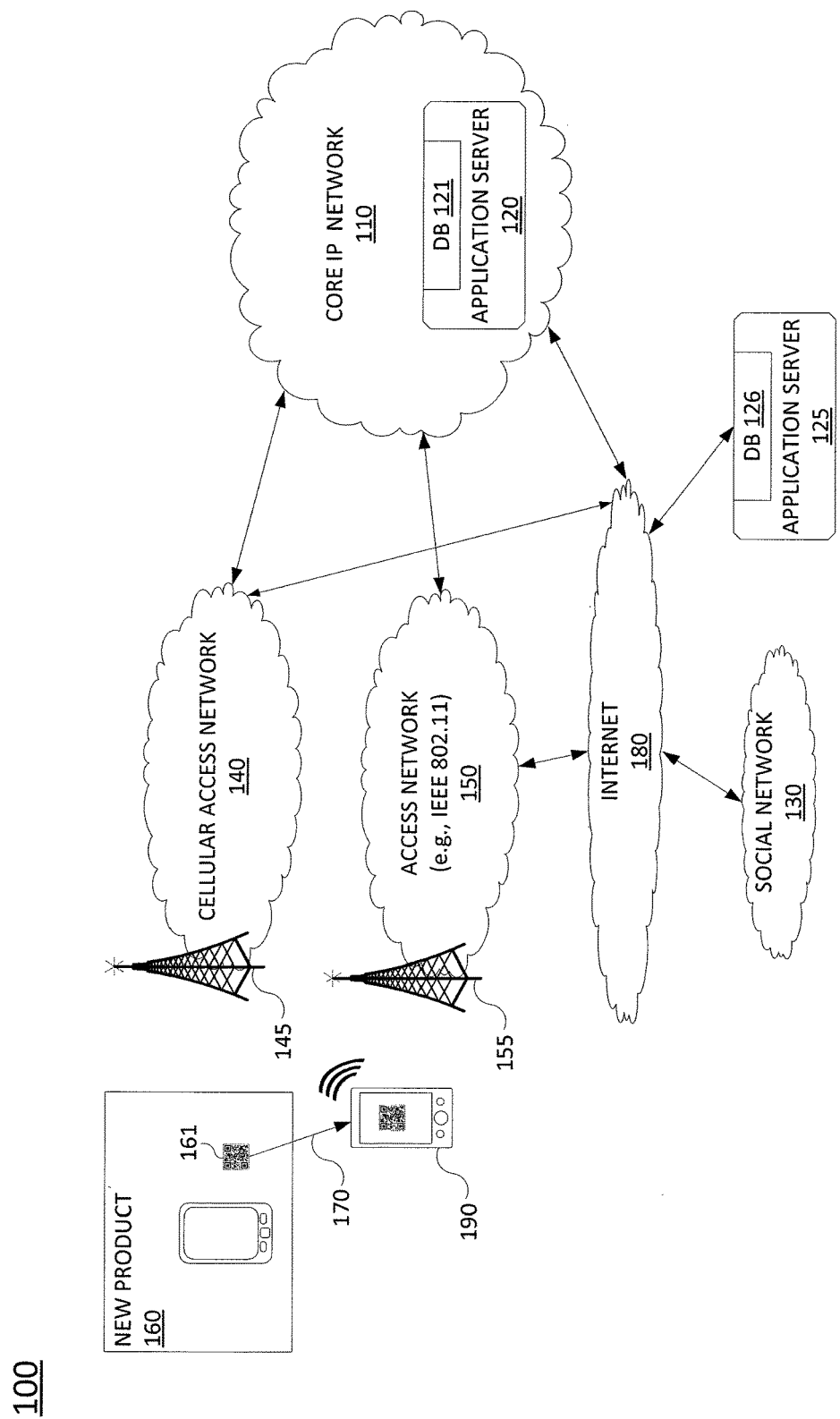
FIG. 1 illustrates an exemplary system related to the present disclosure.

The present disclosure describes a mobile device application for an augmented reality experience that provides customers with additional and/or supplemental information, e.g., on one or more products that may not be available in the store while a customer is browsing various products. The augmented reality is provided via the customer's mobile device (e.g., a smartphone, a computing tablet, and the like), where the mobile device acts as a "smart window" for displaying the additional information. The additional information provided to the customer is also customized using a customer segmentation algorithm that matches customer profile data captured from social media credentials against a database that maps the customer to a specific customer segment. Based on the customer segment assigned, the customized augmented reality experience displayed on the customer mobile device is performed "on-the-fly" while the customer continues his/her shopping experience, without the need for the customer to launch another application and without needing to link to another web site. These and other advantages of the present disclosure are described in greater detail below.

In particular, in one embodiment the present disclosure describes a mobile application in conjunction with a network-based server that uses social media information, e.g., social network information such as profile information from a social network and the like, when permitted by the customer to tailor an in-store shopping experience and provide a personalized, augmented reality experience to a customer. In one embodiment, the customer logs-in to the application on his or her mobile device using login credentials for a social network. The network-based server provides various services to support the mobile application running on the mobile endpoint device of the customer. For example, the network-based server may be managed by the retailer/store-owner, or managed by another party (e.g., a communication network service provider, e.g., a core network service provider, a cellular service provider, and the like) on behalf of the retailer. Accordingly, embodiments of the present disclosure enable the retailer to obtain more insights into its customers and their behaviors in the store, while at the same time providing a valuable, personalized in-store experience for the customer. It should be noted that where a "mobile application" is referred to herein, the term may be used to refer to a software application that runs on a customer's mobile device as well as a software application that runs on the server.

In one illustrative embodiment, a customer walks into a store and logs into the mobile application on his/her mobile device. In some cases, a representative of the retailer may assist the customer in obtaining, e.g., downloading, the mobile application to the mobile device. In one embodiment, the customer logs-in by using social network login credentials. For instance, the login credentials may be securely forwarded to a network-based server for later use in obtaining social network profile information regarding the customer. Once the mobile application is invoked, the customer may hold up the mobile device in a camera mode to any one of several products in the store, e.g., a new phone for sale. The camera, under the control of the mobile application, may detect a frame marker, such as a bar code, e.g., a quick response (QR) code, or other visual identifier that is placed on or near the product by the retailer. Using the marker, the mobile application then communicates with a server to obtain additional information to be used in providing the customer with an augmented reality experience (broadly additional information).

In one embodiment, the server obtains a profile of the customer from the social network and then uses the information about the customer contained in the profile, such as the interests of the customer, in order to tailor the additional information for providing the augmented reality experience to the customer. For example, a social network profile of a customer may indicate that the customer is interested in photography. Thus, when the customer points the camera of his/her mobile device at a marker associated with a new product that the customer is interested in, the marker, or an identification code relating to the marker is passed to the server which determines that more detailed information regarding the product should be presented to the customer. For example, if the product is a new smart phone, the server may determine that additional information regarding the superior camera and image processing features of the new smart phone should be presented to the customer as part of the augmented reality experience, given that the customer is interested in photography. In other words, the additional information is specifically tailored to the customer's interest.

In one embodiment, additional information is maintained in a network database that includes information on various products. The information on the various products may be segmented or marked for presentation to different types of audiences. Thus, different customers with different social media information may experience different augmented realities pertaining to the same product (e.g., the customers are presented with different customized/personalized information) when using the mobile application. For example, a customer may be placed into one or more customer "segments" based upon the social media information contained in the social network profile (e.g., segments can be based on gender (e.g., male or female), age (e.g., children, young adult, adult, or senior), educational level (e.g., high school, college, or graduate school), geographic location of the user (e.g., by city, by state, or by region), professional affiliation, educational affiliation, and the like). The above list of different types of segments contains only examples and should not be interpreted as a limitation of the present disclosure. In addition, different additional information may be selected for presentation to the customer depending upon which segment the customer is placed. For instance, a first set of additional information may be stored for presentation to a first customer segment and a second set of additional information may be stored for presentation to a second customer segment.

In another embodiment, the customer is not placed into a particular segment, or segments, but rather the additional information may be selected based upon a matching algorithm that matches information in the customer's social media profile information (e.g., keywords of the customer's interests) with keywords derived from the universe of additional product information that is available. For example, the retailer may populate one or more database entries relating to the product with keywords which match particular features of the product. For instance, a new smartphone may have a feature that supports multiple user profiles. Thus, this feature may appeal to users who need to maintain separate work and home user profiles. However, this feature may also appeal to parents who wish to have separate profile(s) for their children, e.g., to disable certain features. Thus, the feature may be tagged by the retailer as being related to such diverse topics, keywords and/or profile types as: law enforcement, security, corporate employee, parent, children, and so forth. Accordingly, in one embodiment additional information for an augmented reality experience may be selected (e.g., matched to a customer's social network information) on a feature-by-features basis, rather than by "segmenting" each customer into a segment or group.

In another embodiment, the social media information that is obtained by the server may include information regarding which friends of the customer have already purchased the product, or who have made comments regarding the product on their own social network profiles. As such, the server may determine that supplemental information should be presented to the customer indicating which friends have purchased or recommend the product, which friends have commented on the product, the contents of the comments by one or more friends, the average rating of the product by the customer's friends, and so forth. The server may obtain this supplemental information from a social media or retail owner data base. Thus, the server may select additional information on the product for presentation to the customer based upon the social network information. Further, the additional information may also include supplemental information obtained directly from the social network, such as comments by friends, and so forth. Accordingly, the server may transmit the additional information to the mobile device for presenting an augmented reality experience on a display of the device by the mobile application running on the mobile device.

In one embodiment, the augmented reality experience is provided via a display of the customer's mobile device. For example, in one embodiment, an image comprising a background environment may be displayed. Within the background environment, the additional information on the product that has been selected for the customer is displayed in the camera "window". Only the customer can see the additional information and only if the customer holds the mobile device up to the marker associated with a product in order to trigger the augmented reality experience with respect to that particular product. Any number of variations may be provided with respect to the customization of the augmented reality experience based upon the customer's social network information. For instance, in addition to selecting different product information to present to the customer, the background environment may also be differentiated based upon the social network information. For instance, if the social media information indicates that the customer is a fan of a particular professional sports team, the background environment may be selected to present a theme based upon that particular sports team. Similarly, if the customer is a fan of a particular movie or television program, a background theme may be selected based upon such a program. Thus, numerous additional variations of this nature are possible in accordance with the present disclosure.

In another embodiment, the customer is enabled to save the product or rate the product via the mobile application. For example, the mobile application may assist the customer in later comparing the product to a different product in a different part of the store. In addition, embodiments of the present disclosure also provide increased product awareness to a diverse audience through various social media channels by enabling the sharing of information on products in the store within the social network via the mobile application. In particular, a customer who has logged-in to the mobile application using social network login credentials can post product information to his/her social network directly from an interface of the mobile application. For example, the customer can solicit opinions from friends regarding whether or not the customer should purchase the product, which color should be selected, which optional features the customer should choose, and so forth. Likewise, the customer may present his/her own comments, ratings, rankings and so forth regarding the product. For example, the customer may have tested the product while in the store and may wish to share this information with his/her friends on the social network. Notably, posting to a social network may increase the likelihood of purchase (both by the customer, as well as by the customer's friends) due to the viral nature of the topic. In still another embodiment, if the customer does not make an in-store purchase, the customer can save the product(s) information that the customer has viewed in the store, re-open the mobile application, e.g., while at home, and be returned to the augmented reality product information that the customer was presented while in the store. In addition, the customer can be linked to an online shopping experience associated with the retailer in order to complete an online purchase transaction for the product at any time after leaving the store.

Various additional features are provided in one or more embodiments of the present disclosure. For instance, the mobile application may be integrated with point-of-sale (PoS) terminals situated in the store in order to assist retail personnel to complete a purchase transaction. In still another embodiment, the mobile application is integrated with other customer/marketing information to provide further segmentation of customers to enhance differentiated augmented reality experiences. For instance, the mobile application may be maintained by a communication network service provider, which may also be the retailer operating the retail store (e.g., a phone store). As such, the network service provider may have its own customer profile information regarding the customer such as, a current mobile device type, contract information, e.g., to determine when the customer may be available for certain discounts, upgrades and/or incentives, to determine whether additional changes or upgrades to a subscription may be desirable if purchasing a new product, to determine whether additional subscriptions products are available to the customer, and so forth. For example, a user may already have a mobile device. However, the retailer may be offering a discount on remote home monitoring and security services with the purchase of any new smart mobile device. As such, if the network service provider customer profile information is available to the mobile application (as an alternative to, or in addition to the social network profile information), the mobile application may select additional information regarding this service to offer to the customer if the customer selects to receive additional information regarding an eligible product.

It should be noted that the mobile application may function without the customer logging-in with social network credentials. For example, a generic augmented reality experience may be provided that highlights the features of the product that are the most impressive and the most interesting to a large audience in general. However, having the customers' social network information provides the retailer with an opportunity to better understand customer behavior and patterns and to point out product features which are of most interest to the customers, thereby meeting their needs and desires.

The above disclosure highlights various features and advantages of embodiments of the present disclosure for providing an augmented reality experience. To better understand the present disclosure, FIG. 1 illustrates in greater detail an exemplary system 100 for providing an augmented reality retail experience according to the present disclosure. Although the present disclosure is discussed below in the context of a particular system or network architecture, the present disclosure is not so limited. Namely, the present disclosure can be applied to any type of communication network that is capable of transmitting data, such as a local area network (LAN), a wireless local area network (WLAN), an Internet Protocol (IP) network, such as an Internet Protocol/Multi-Protocol Label Switching (IP/MPLS) core network, an IP Multimedia Subsystem (IMS) network, communications over the Internet in general, and so forth.

As shown in FIG. 1, the system 100 connects a mobile device 190 with one or more application servers via a core internet protocol (IP) network 110, a cellular access network 140, an access network 150 and/or Internet 180. The system 100 also includes a social network 130 for providing social network information regarding a user of the mobile device 190, as described in greater detail below.

In one embodiment, access network 150 may comprise a non-cellular access network such as a wireless local area network (WLAN), an IEEE 802.11 network, a "wired" access network, e.g., a local area network (LAN), an enterprise network, a metropolitan area network (MAN), a digital subscriber line (DSL) network, a cable network, and so forth. As such, mobile device 190 may comprise a non-cellular device, such as a personal computer, a laptop computer, a Wi-Fi device, a tablet, a server (e.g., a web server), and so forth, or may have both cellular and non-cellular access capabilities.

In one embodiment, cellular access network 140 may comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, cellular access network 140 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 140 is shown as a UMTS terrestrial radio access network (UTRAN) subsystem. Thus, element 145 may comprise a Node B or evolved Node B (eNodeB).

In one embodiment core IP network 110 comprises network devices or elements (not shown) which are capable of routing and forwarding IP packets between different hosts over the network. However, in one embodiment, the components of core IP network 110 may have additional functions, e.g., for functioning as a public land mobile network (PLMN)-General Packet Radio Service (GPRS) core network, for providing Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that although core IP network 110 is described as an Internet Protocol network, this does not imply that the functions are limited to IP functions, or that the functions are limited to any particular network layer.

FIG. 1 also illustrates a display 160 (e.g., an electronic display such as a screen or a non-electronic display such as a paper sign) which may include an actual product and/or information regarding a product (e.g., a new mobile device/phone). For example, the display 160 may be located in a retail store and relate to a particular product that is for sale. In one embodiment, the display 160 includes a frame marker 161, such as a quick response (QR) code, a bar code, an image, a frame marker, or other unique identifier that can be captured by a mobile device in order to obtain a unique identification code identifying a product. In another embodiment, the display 160 may utilize a different method for providing a unique identifier, such as an infrared signal or other near-field communication broadcast, a radio frequency signal (e.g., a Bluetooth signal, a radio frequency identification (RFID) signal), or the like which may be obtained by the mobile device when it is within the vicinity of the display via an infrared sensor, a Bluetooth antenna, or the like. In another embodiment, the display 160 may present an identification code that is encoded or embedded within one or more pixels, images, videos or other forms of media that are presented on a screen of the display. In this regard, it should be noted that where frame markers are referred to throughout the present disclosure, other methods mentioned herein for providing a unique identifier may be similarly utilized in different embodiments.

In one embodiment, mobile device 190 may comprise any endpoint device configured for wireless communication such as a personal computer, a laptop computer, a Personal Digital Assistant (PDA), a mobile phone, a smartphone, an email device, a computing tablet, a messaging device, and the like. In accordance with the present disclosure, the mobile device 190 may run an augmented reality application as a native application, web server application or a hybrid native/web server application for providing an augmented reality retail experience to a customer (i.e., the user of the mobile device). In one embodiment, the customer logs-in to the augmented reality application using login credentials for a social network profile of the customer. Notably, the augmented reality application allows the customer to access an augmented reality experience presented by a retailer. As such, the augmented reality application may securely forward the login credentials to an augmented reality application server that is maintained by or on behalf of the retailer.

In one embodiment, the retailer may also comprise a telecommunications network service provider. For example, the retailer/network service provider may maintain an application server 120 in core IP network 110 for providing the augmented reality experience. Alternatively, the network service provider (e.g., the owner and/or operator of core IP network 110) may maintain application server (AS) 120 on behalf of one or more retailers in other industries (e.g., an automotive retailer, a toy store, an electronic store, etc.). The application server 120 may include a database (DB) 121. In one embodiment, the DB 121 stores additional product information for providing the augmented reality experience and information on customer segments, and temporarily stores customers' social network login credentials, as will be described in greater detail below. In one embodiment, AS 120 may comprise any hardware server or computer that is well known in the art, and the database 121 may be any type of electronic collection of data that is also well known in the art.

In still another embodiment, a retailer (e.g., one that is not also a network service provider) may maintain its own application server, e.g., AS 125, which is simply reachable via the Internet 180 in general for providing an augmented reality experience to its customers. Thus, in one embodiment, AS 125 may comprise any hardware server or computer that is well known in the art, and the database 126 may be any type of electronic collection of data that is also well known in the art. Accordingly, AS 125 may provide the same or substantially similar functions as AS 120, as described herein.

Figure 2:
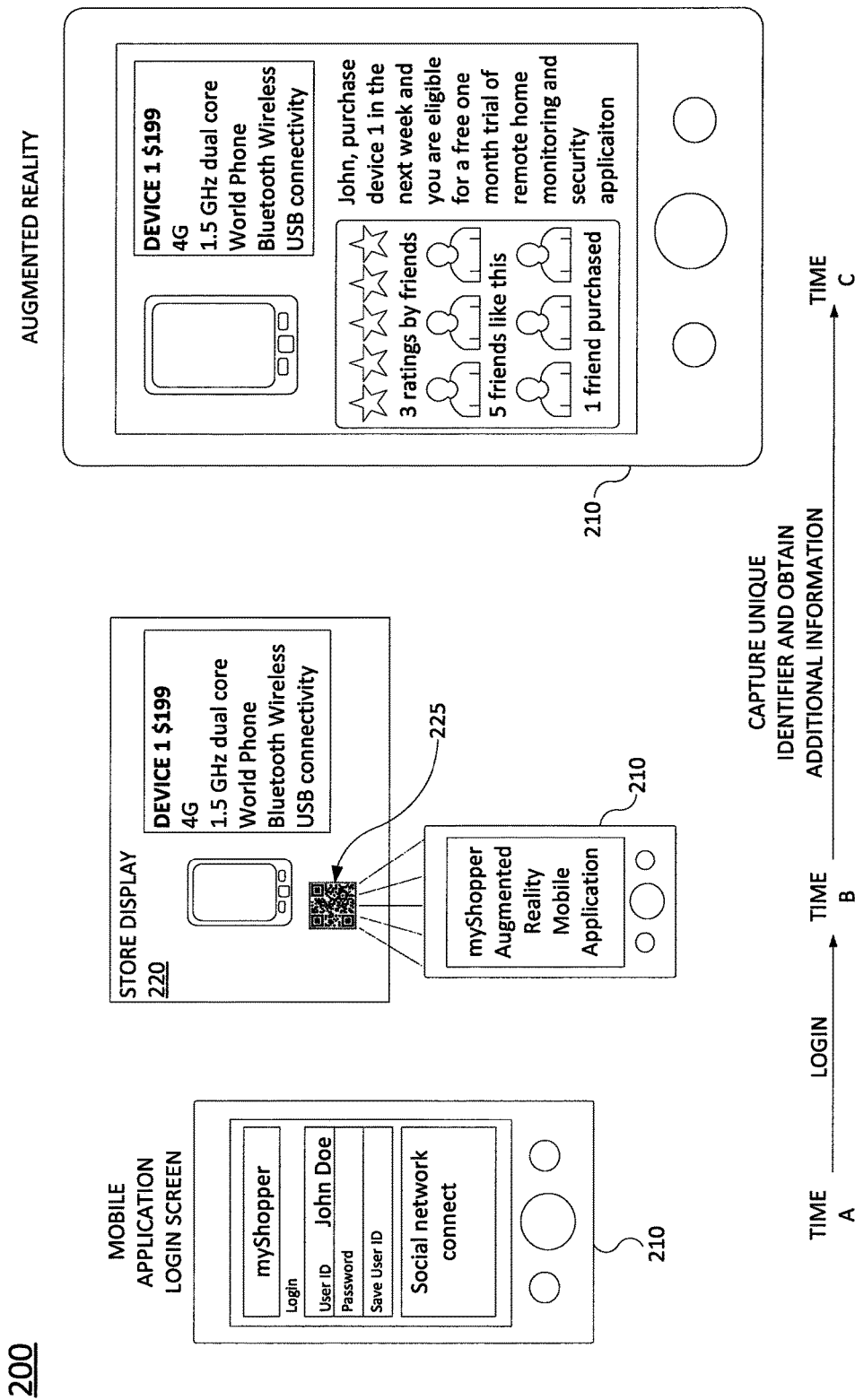
FIG. 2 illustrates an exemplary retail environment for presenting an augmented reality experience on a mobile device according to the present disclosure.

As shown in FIG. 1, the mobile device 190 captures or reads the unique identifier presented by the display 160. For example, the display 160 may include a frame marker image or graphic on the display (e.g., a QR code). In one embodiment, the unique identifier is used to obtain an identification code that uniquely identifies the product that is included in, or is the subject of the display 160. FIG. 2 illustrates in greater detail an exemplary display having a frame marker located thereon, as well as a mobile device capturing the frame marker and displaying an augmented reality on a screen of the mobile device.

In one embodiment, the mobile device 190 obtains the unique identifier from the display 160 via an optical sensor, e.g., an image capturing sensor such as a camera, of the mobile device. In one embodiment, the unique identifier is associated with an identification code that identifies a product of the display 160. For example, each product that may be presented in one or more displays in a store may have a different identification code and a different unique identifier (e.g., frame marker/QR code) associated with the identification code. In one embodiment, the mobile application (e.g., the augmented reality application that is running on the mobile device 190) includes a local database for correlating unique identifiers to identification codes. Thus, in one embodiment the mobile device 190 may locally perform a lookup to obtain the identification code associated with the unique identifier.

After the mobile device 190 has obtained the identification code and/or unique identifier of a product, the mobile device 190 sends a request to obtain additional, augmented reality information to an augmented reality application server (e.g., AS 120 or 125). Notably, the request includes the identification code and/or unique identifier obtained by the mobile device 190 from the display 160. For example, in one embodiment AS 120 performs a lookup (e.g., in database (DB) 121) to identify a product associated with the unique identifier. In one embodiment, the mobile device 190 sends the request to the application server via a wireless access point, e.g., an IEEE 802.11 access point or Wi-Fi access point and a wireless access network (e.g., access network 150). For example, the retail store may provide a wireless access point to allow its customer to freely use the augmented reality application without incurring cellular usage. However, in another embodiment, the mobile device 190 sends the request via a cellular access point, e.g., a base station, a base transceiver station (BTS), a Node B, or an evolved Node B (eNodeB) (e.g., element 145), and cellular access network 140.

In one embodiment, where the augmented reality application server is hosted in core IP network 110 (AS 120), the core IP network 110 may perform any number of processes in connection with establishing the communication session, such as performing authentication and authorization checks against the mobile device 190, and the like. For example, the communication session may traverse over core IP network 110 and access network 150 and/or cellular access network 140. However, in other embodiments (e.g., using AS 125) the communication session between the mobile device 190 and the augmented reality application server need not traverse over the core IP network 110. Henceforth, for illustrative purposes only, embodiments will be described only in connection with AS 120. However, it should be understood that such embodiments may be similarly implemented with one or more other application servers, such as AS 125, in accordance with the present disclosure.

In one embodiment, after identifying a product based upon the identification code or unique identifier sent by the mobile device 190, AS 120 obtains a profile of the customer from the social network 130. For instance, AS 120 may have stored social network login credentials of the customer when the customer started the mobile application on endpoint device 190. Thus, AS 120 may present the login credentials to social network 130 in order to access or to request social network information of the customer. In one embodiment, the social network 130 may provide a limited set of customer profile information to AS 120. For example, an application programming interface (API) for the social network may define that only a certain set of customer profile information may be presented to third parties (such as AS 120) when presenting customer login credentials. In other words, the AS 120 is not granted full access to the customer's social media profile and features of the social network as if the customer had logged into the social network directly.

AS 120 then uses information about the customer contained in the profile, such as the interests of the customer, in order to tailor and customize an augmented reality experience for the customer. For example, AS 120 may place the customer into one or more customer "segments" based upon the social network profile information. In addition, different additional information may be selected by AS 120 for presentation to the customer depending upon which segment the customer is placed. As such, AS 120 may transmit the additional information that is selected back to mobile device 190 (e.g., via core IP network 110 and access network 150). In turn, mobile device 190 presents, via the mobile application, an augmented reality to the customer. For example, the mobile application may present a background within or upon which the additional information sent by AS 120 is displayed. It should be noted that the additional information is not strictly limited to text information regarding the product, but may include images or videos, e.g., showcasing the product or one or more components of the product. The additional information may also comprise executable instructions, e.g., instructions to cause the mobile application to render a particular scene or to present the additional information in a particular order, to present an interactive scene or form to the user, and so forth.

In addition, as described above, embodiments of the present disclosure also provide a variety of additional features, such as enabling a customer to save an augmented reality experience, to compare one product to another or to post information to the social network. These further functions are enabled through additional communications between endpoint device 190, AS 120 and/or social network 130 as depicted in FIG. 1.

FIG. 2 illustrates an exemplary retail environment 200 having a display 220 with an associated frame marker 225. FIG. 2 also illustrates an exemplary mobile device 210. It should be noted that the same mobile device 210 is illustrated at different periods of time, in sequence, e.g., Time A, Time B and Time C. In particular, at Time A, the mobile device is displaying a login screen for a mobile augmented reality application (called "myShopper" in the example of FIG. 2) where a customer/user is presented with the opportunity to use social network login credentials to sign-in. In this case, a customer/user "John Doe" has begun the login process. At later Time B, the same mobile device 210 is running the mobile application. For example, the user John Doe may have completed the login process begun at Time A. At Time B, the mobile device 210 is shown near the in-store display 220. For example, the user John Doe may have approached the display 220 in the store. Notably, the display 220 includes an image of a product, or an actual model of the product (in this case a new smart computing device), along with basic text information about the product and a frame marker 225. In addition, as shown at Time B, the mobile device 210 is capturing the frame marker 225 on the display 220, e.g., via an optical sensor, or camera of the mobile device.

As described above, the mobile application may transmit the marker, or an identification code derived from the marker to a network-based server to obtain additional, augmented reality information. Accordingly, at later Time C, the mobile device 210 is shown providing an augmented reality to the customer/user on the screen of the mobile device. For instance, at Time C the mobile device 210 is presenting the same image of the product and the same basic information as show on the in-store display 220. However, the augmented reality includes additional information that is only for John Doe. In particular, an average rating of the product from John's friends is displayed on the bottom left portion of the screen as one example, but can be displayed in various fashions. In addition, a special offer is also presented for John Doe on the bottom right portion of the screen. It should be noted that the example shown in FIG. 2 is presented for illustrative purposes only. In other words, numerous other products, display types, additional information, background scenes, and so forth may be implemented in accordance with the present disclosure.

Figure 3:
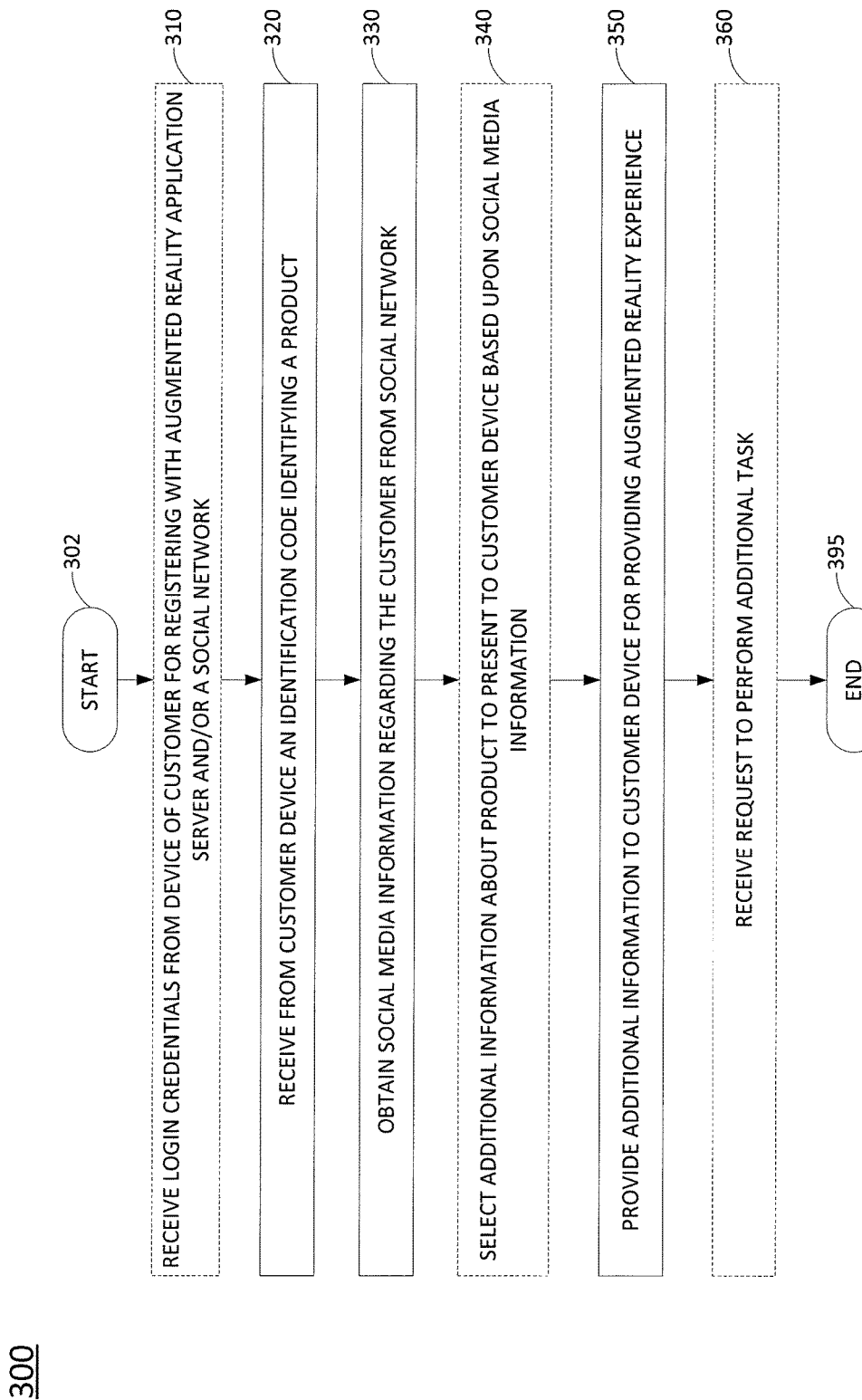
FIG. 3 illustrates a flowchart of a method for providing an augmented reality experience according to the present disclosure.

To better understand the present disclosure, FIG. 3 illustrates a flowchart of a method 300 for providing an augmented reality experience. Thus, in one embodiment the steps, operations or functions of the method 300 may be performed by any one or more of the components of the system 100 depicted in FIG. 1. For example, in one embodiment, the method 300 is performed by one of the application servers 120 or 125 in FIG. 1. Alternatively, or in addition, one or more steps, operations or functions of the method 300 may be implemented by a general purpose computer having a processor, a memory and input/output devices as illustrated below in FIG. 5, specifically programmed to perform the steps, functions and/or operations of the method.

The method 300 begins in step 302 and proceeds to step 310. At step 310, the method 300 receives login credentials from a customer device. For example, the login credentials received at step 310 may comprise login credentials the customer uses with a social network. In one embodiment the login credentials may alternatively be for establishing a connection between an augmented reality mobile application of the customer device and an augmented reality application server. In one embodiment, the login credentials simultaneously register a customer with an augmented reality application server as well as a social network. In one embodiment, step 310 is optional. In other words, a customer need not login to obtain an augmented reality experience. However, the method may be limited in its ability to provide a customized augmented reality experience to the customer if the customer chooses not to provide the login credentials. In one embodiment, the social network is hosted and maintained by a party that is different than the provider of the augmented reality application server. In one embodiment, at step 310 the method 300 further records an IP address and/or port number, or other identifier of the customer device to associate the customer device with the login credentials and to identify the source and destination for future communications.

At step 320, the method 300 receives from the customer device an identification code that identifies a product. In one embodiment, the identification code comprises a unique identifier, such as a frame marker or a QR code. For example, in one embodiment each of a plurality of products in a retail environment is assigned a unique identifier and identification code such that a customer may use his or her mobile device to capture a unique identifier from a display and access an augmented reality experience associated with the respective product. In one embodiment, the customer device obtains the identification code from a unique identifier prior to transmitting a request. For example, a list associating unique identifiers with identification codes may have previously been downloaded to the customer device and stored for use by the augmented reality application. In one embodiment, the request includes an identifier of the customer. For example, a cookie, a token or similar identifier may have been provided to the customer device following the receipt of login credentials at step 310. Alternatively, the method may simply identify the customer device via an IP address and/or port used by the customer device conveyed along with the request.

At step 330, the method 300 obtains social network information regarding the customer from a social network. For example, the method may determine a particular customer originating a request via a cookie, token, IP address, port, and so forth. In addition, a social network may be maintained by an entity that is different from an entity that is providing the augmented reality application server. As such, the method 300 may query the social network to provide social network information regarding the customer. In one embodiment, the method provides the customer's login credentials received at step 310 to the social network in order to access the customer's social network information. In one embodiment, the social network information comprises interests of the user. For instance, the customer may have a list of one or more self-described interests, such as one or more hobbies, a professional sports team that the customer follows, and the like. In addition, the customer's social network information may also indicate an interest or desire to for one or more products or product types. For example, the customer may be interested in expensive automobiles. Thus, the customer may "like" a number of expensive automobiles, notwithstanding that the customer may not own such automobiles. The customer may also "like" a number of different products or companies, restaurants, places the user has visited or would like to visit, and so forth. Likewise, the social network information may indicate goals and desires of the customer, such as to achieve greater status in the workplace, to spend more time with family, to learn how to fly a plane, and so forth. Similarly, the customer's profile may also indicate professional affiliations, a job title, company, educational background, languages spoken, and a myriad of other potentially relevant information that can broadly be consulted to determine the interests, goals and desires of the customer. Thus, in accordance with the present disclosure, it is contemplated that any and all such social network information that a social network is willing and capable of providing and a customer allows to be used may be used by the present method in determining the interests of the user, for classifying the user into a segment for selecting relevant information tailored to the interests, desires and goals of the user at step 340 below.

In one embodiment, the social network information also comprises information regarding the customer's friends. For example, the social network may provide information regarding which of the customer's social network connections have already purchased the product or have commented on the product, the contents of the comments, the rating(s) given to the product by the customer's connections, and so forth.

At step 340, the method 300 selects additional information to provide to the customer device based upon the social network information. For example, the method may segment customers into any number of different groups and provide different additional information to send to the different customer devices to provide diverse augmented reality experiences. For instance, a customer may have transmitted an identification code of a new smart phone product. Thereafter, the method 300 may obtain the customer's social network information which indicates an interest in photography. Accordingly, the method may associate the customer with a segment associated with "photography". Any users who are placed in the "photography" segment may then be provided with additional information that highlights the image capture and image processing capabilities of the product. Likewise, a different customer may have a social network profile that indicates an interest in camping, hiking or boating, for example. Thus, the customer may be placed in a segment relating to "outdoor activities." As such, the method may select additional information to provide to a customer in this segment, where the additional information focuses on the waterproof capabilities of the same product, GPS and mapping capabilities, and so forth.

In one embodiment, the method 300 does not strictly "segment" the user into one or more categories/segments, but rather may tailor the selected content/additional information with greater granularity using more nuanced algorithms. For instance, the social network information obtained at step 330 may indicate that the customer has a specific goal, aspiration or desire. If the particular product that the customer is browsing happens to have particular utility for such an goal (e.g., by determining that the user wishes to learn to fly an aircraft) the method 300 may select additional information to present to the customer to remind the customer of this goal and to also point out the particular features of the product that are useful to achieving that specific and particular goal (e.g., a global positioning system (GPS) component with improved accuracy and reliability in all conditions, the ability to store and display flight manuals and aeronautical maps, a dependable emergency beacon, etc.).

Similarly, as described in connection with step 330 above, the social network may also provide information regarding the customer's connections as pertains to the particular product, e.g., comments posted by friends to the social network. As such, in step 340, the method 300 may alternatively or additionally select this supplemental information from the social network to be presented to the customer. For example, this supplemental information may indicate to the customer that a number of the customer's friends have purchased and/or are using the product, thereby helping the customer to decide that the product is a desirable purchase.

At step 350, the method 300 provides the additional information to the customer device for providing the augmented reality experience. As mentioned above, the additional information relates to the particular product identified at step 320 and is selected based upon the social network information of the particular customer, as described at step 340. Further, the additional information may also include supplemental information from the social network regarding friends/connections of the customer as relates to the particular product. Accordingly, an augmented reality application on the customer device may then display the additional information to provide the augmented reality experience to the customer. For example, a different scene containing the product may be presented to different customers requesting an augmented reality experience for the same product. In one embodiment, special features of the product are presented on a screen of the customer's device that is not provided to any of the other customers in the store. Similarly, the additional information may comprise a special offer, such as a reduced price for particular customers. For example, a customer with a large number of friends, followers, etc., may be offered a discount as an incentive to purchase a particular product in the hopes that this customer may influence others to make a similar purchase in the future.

At optional step 360, the method 300 receives a request to perform an additional task. For example, the customer may wish to compare the product to a different product in the store. Thus, the method may receive an identification code for a different product. The method may then inquire whether the customer would like to compare the first product to the second product. If the response from the customer is affirmative, then the method may select additional information regarding the second product for further presentation in an augmented reality experience for the customer. For example, the method may select certain information regarding the second product to allow a comparison of the same or similar features of the two products. Thus, the additional information selected regarding the second product may be the same or may be different than the additional information that might be selected for the customer with respect the second product in a non-comparative setting (e.g., if the customer was only interested in an augmented reality experience regarding the second product and was finished with the first product).

Similarly, at step 360 the method 300 may receive from the customer device a request to post information regarding the product to the social network. For example, the customer can solicit opinions from friends regarding whether or not the customer should purchase the product, which color should be selected, which optional features the customer should choose, and so forth. Likewise, the customer may present his/her own comments, ratings, rankings and so forth regarding the product. For example, the customer may have tested the product while in the store and may wish to share this information with his/her friends on the social network. Accordingly, if the method 300 receives such a request from the customer's mobile device to post information to the social network, the method may solicit the desired information from the customer device and forward the information to the social network to post to the customer's social media location.

Following step 360, the method 300 proceeds to step 395 where the method ends.

Figure 4:
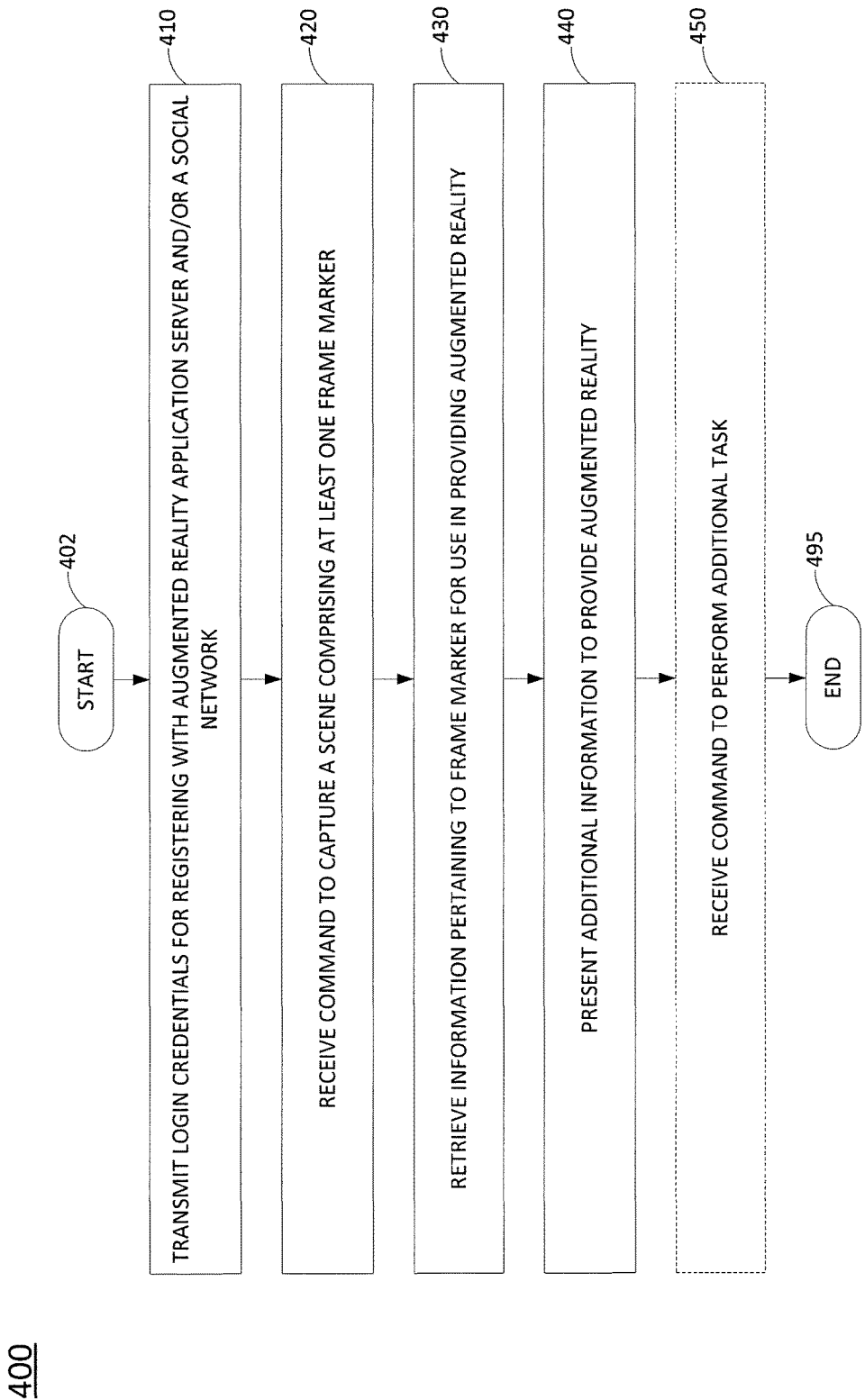
FIG. 4 illustrates a flowchart of an additional method for providing an augmented reality experience according to the present disclosure.

FIG. 4 illustrates a flowchart of an additional method 400 for providing an augmented reality experience. In one embodiment, the steps, operations or functions of the method 400 may be performed by the mobile device 190. Alternatively, one or more steps, operations or functions of the method 400 may be implemented by a general purpose computer having a processor, a memory and input/output devices as illustrated below in FIG. 5, specifically programmed to perform the steps, functions and/or operations of the method. Although any one of the elements in system 100 may be configured to perform various steps, operations or functions of the method 400, the method will now be described in terms of an embodiment where operations of the method are performed at a mobile device.

The method 400 begins in step 402 and proceeds to optional step 410. In step 410, the method transmits login credentials for registering with augmented reality application server and/or with a social network. For example, a customer may start an augmented reality mobile application on a mobile device. In addition, the customer may be presented with a login screen where the customer has the option of using login credentials for a social network. Thus, if the customer chooses to present his/her login credentials for the social network, at step 410, the method 400 may transmit the credentials to an augmented reality application server and/or to the social network. In one embodiment, the augmented realty application server may store the credentials for later retrieval of social network information of the customer from the social network. Thus, in one embodiment at step 410, the method need not transmit the social network login credentials directly to the social network.

At step 420, the method 400 receives a command to capture a scene comprising at least one frame marker. For example, the customer may invoke a mobile application when entering a retail environment that provides an augmented reality experience accessible via the mobile application. When running, the mobile application may interface to an optical sensor, e.g., the camera, of the mobile device in order to allow the customer to capture frame markers associated with one or more products displayed in the retail store. For, example, the customer may hold the camera up to a frame marker that is included on or within a particular product display and press a button on the mobile device that causes the image of the frame marker to be captured. In one embodiment, the method 400 may check a local database (e.g., stored on the mobile device) to associate the frame marker with a unique product identifier.

At step 430, the method 400 retrieves information pertaining to the frame marker for use in providing an augmented reality to the customer. For instance, the method 400 may transmit the frame marker (e.g., as a raw image), or a unique identifier derived from the frame marker, to a network-based augmented reality application server. In response, the server may select one or more pieces of additional information pertaining to the product associated with the frame marker/unique identifier to be presented to the customer. In one embodiment, the additional information is selected based upon social network information of the customer that the server obtains from a social network. For instance, the server may present the social network login credentials to a social network to obtain at least a portion of the customer's social network profile information. The server may then use this information to "segment" the customer and thereby select which additional information that is available relating to the product to present to the customer. The information that is selected for presentation to the customer is retrieved by the method 400 at step 430. It should be noted that the additional information pertaining to the product may include not only images, text or video related to the product, but may also include instructions for rendering an augmented reality environment for display to the customer. For example, the additional information may describe a particular scene or setting to use as a background, may prescribe a particular order in which to present information, may instruct the mobile device to present a number of softkeys to access additional information and dictate where such softkeys should be presented, and so forth.

At step 440, the method 400 presents the additional information retrieved at step 430 to the customer. For example, the additional information may describe a particular scene or setting to use as a background and may list certain product features to be presented to the customer. For instance, if the social network profile information of the customer indicates that the customer has a photography hobby, the additional information that is presented may include an up close image of the camera on the device as well as in-depth descriptions of the camera components and capabilities (e.g., where the product may comprise a new smart computing device). In another embodiment, the additional information may also include supplemental information, such as comments from the customer's friends/social network connections regarding the product, e.g., ratings from friends who already own the product or who have tested the product.

At optional step 450, the method 400 receives a command to perform an additional task. For example, the customer may wish to compare the product to a different product in the store. Thus, the method may receive an identification code for a different product. The method may then inquire whether the customer would like to compare the first product to the second product. If the response from the customer is affirmative, then the method 400 retrieve additional information regarding the second product for further presentation in an augmented reality experience for the customer. For example, the method may obtain from the server certain information regarding the second product to allow a comparison of the same or similar features of the two products. Similarly, the method 400 may receive a command to post information regarding the product to the social network. For example, the customer can solicit opinions from friends regarding whether or not the customer should purchase the product, which color should be selected, which optional features the customer should choose, and so forth. Likewise, the customer may present his/her own comments, ratings, rankings and so forth regarding the product. For example, the customer may have tested the product while in the store and may wish to share this information with his/her friends on the social network. Accordingly, if the method 400 receives such a command to post information to the social network, the method may prompt the user to enter the desired information and forward the information to the augmented reality application server. In turn, the server may forward the information to the social network to post to the customer's social media location.

Following step 450, the method 400 proceeds to step 495 where the method ends.

In addition, although not specifically specified, one or more steps, functions or operations of the respective methods 300 and 400 may include a storing, displaying and/or outputting step as required for a particular application. In other words, any data, records, fields, and/or intermediate results discussed in the methods can be stored, displayed and/or outputted either on the device executing the methods 300 or 400, or to another device, as required for a particular application.

Furthermore, steps, blocks, functions or operations in FIGS. 3 and 4 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the example embodiments of the present disclosure.

Figure 5:
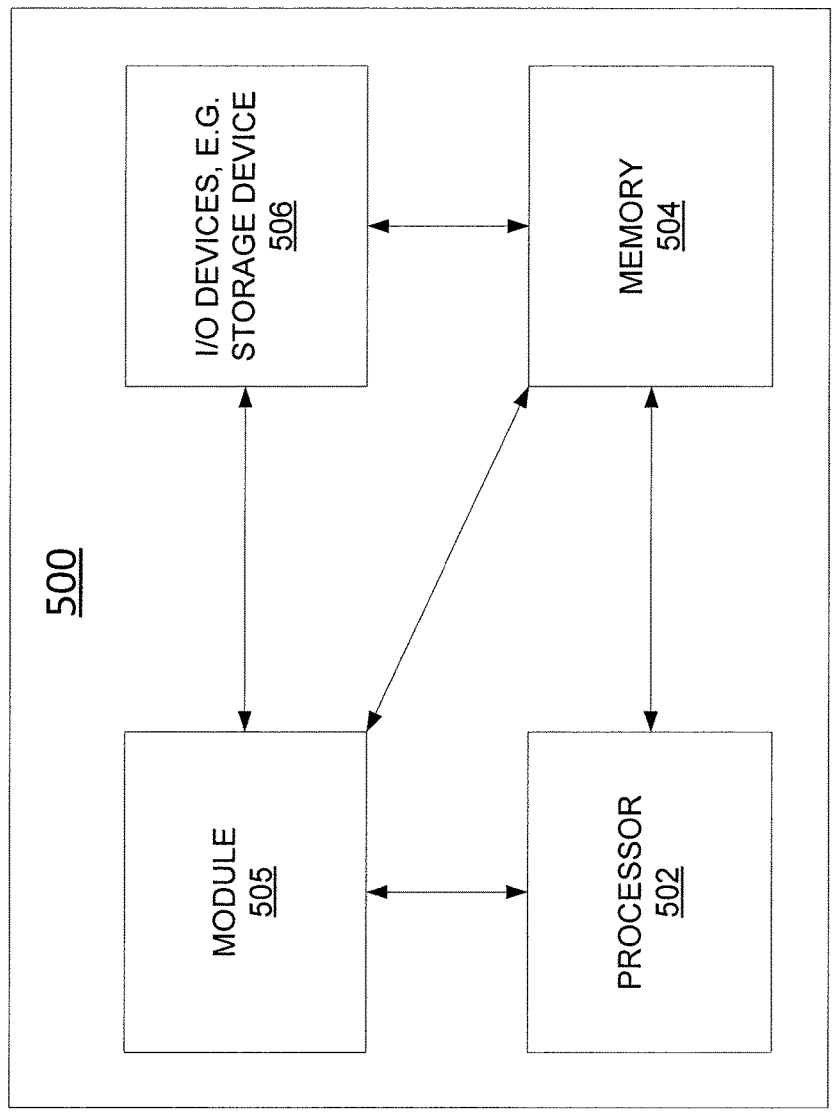
FIG. 5 illustrates a high-level block diagram of a general-purpose computer suitable for use in performing the functions, methods, operations and algorithms described herein.

FIG. 5 depicts a high level block diagram of a general purpose computer or system suitable for use in performing the functions described herein. For example, any one or more components or devices illustrated in FIG. 1 or described in connection with the methods 300 and 400 may be implemented as the system 500. As depicted in FIG. 5, the system 500 comprises a hardware processor element 502 (e.g., a microprocessor, a central processing unit (CPU) and the like), a memory 504, (e.g., random access memory (RAM), read only memory (ROM) a disk drive, an optical drive, a magnetic drive, and/or a Universal Serial Bus (USB) drive), a module 505 for providing an augmented reality experience, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that embodiments of the present disclosure can be implemented in software and/or in a combination of software and hardware, e.g., using application specific integrated circuits (ASIC), a general purpose computer or any other hardware equivalents, e.g., computer readable instructions pertaining to the methods discussed above can be used to configure a hardware processor to perform the steps, functions and/or operations of the above disclosed methods. In one embodiment, the present module or process 505 for providing an augmented reality experience can be implemented as computer-executable instructions (e.g., a software program comprising computer-executable instructions) and loaded into memory 604 and executed by hardware processor 502 to implement the functions as discussed above in connection with the exemplary methods 300 and 400 respectively. As such, the present module or process 505 for providing an augmented reality experience as discussed above in respective methods 300 and/or 400 (including associated data structures) can be stored on a non-transitory (e.g., tangible or physical) computer readable storage medium or device, e.g., RAM memory, magnetic or optical drive or diskette and the like.

It should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing additional information, the method comprising:
displaying, by a mobile application of a device of a customer, a view of a product offered for sale at a venue while the mobile application of the device is in a camera mode;
receiving an identification code identifying the product, by a processor of a retailer or a network provider and over a communication network from the mobile application of the device of the customer, the identification code identifying the product while the mobile application of the device is in the camera mode;

obtaining, by the processor, social media information regarding the customer from a social network, wherein the social media information comprises an interest of the customer, wherein the interest of the customer is a hobby of the customer;

selecting, by the processor, the additional information of a feature of the product that is identified by the identification code based upon the hobby of the customer;

selecting, by the processor, a background environment based upon the hobby of the customer, wherein the background environment presents a theme based on the hobby of the customer, wherein the background environment is distinct from the view of the product offered for sale at the venue;

providing, by the processor and over the communication network, the additional information of the feature of the product that is identified by the identification code and the background environment to the mobile application of the device of the customer to display the additional information of the feature of the product that is identified by the identification code on the background environment that is selected as at least a part of an augmented reality presentation by the mobile application of the device; and presenting, by the mobile application of the device, the augmented reality presentation that includes the additional information of the feature of the product that is identified by the identification code and the background information while the mobile application of the device is displaying the view of the product to tailor a shopping experience presented to the customer.

2. The method of claim 1, wherein the additional information is selected based upon a customer segment in which the customer is placed based on the social media information.

3. The method of claim 1, further comprising:
storing a first set of additional information relating to the product for presentation to a first segment of customers and a second set of additional information relating to the product for presentation to a second segment of customers.

4. The method of claim 1, further comprising:
receiving login credentials for registering the customer with an application server.

5. The method of claim 1, wherein the processor is a processor of an application server.

6. The method of claim 5, wherein the application server stores identification code information for identifying a plurality of respective products.

7. The method of claim 1, further comprising:
receiving login credentials for registering the device of the customer with the social network.

8. The method of claim 1, wherein the identification code is obtained by the device of the customer via an optical sensor.

9. The method of claim 8, wherein the optical sensor comprises a camera.

10. The method of claim 1, wherein the identification code is obtained via a frame marker associated with a display of the product.

11. The method of claim 1, wherein the social media information further comprises:
information identifying a friend of the customer, wherein the friend has purchased the product.

12. The method of claim 1, wherein the social media information further comprises:
information identifying a friend of the customer, wherein the friend has commented on the product on the social network.

13. The method of claim 1, further comprising:
receiving a request from the device of the customer to post information regarding the product on the social network.

14. The method of claim 1, further comprising:
receiving a request from the device of the customer to store the additional information.

15. The method of claim 14, further comprising:
receiving from the device of the customer a second identification code identifying a second product; and
providing second additional information to the device of the customer, wherein the second additional information relates to a feature of the second product, and wherein the second additional information is based upon the social media information.

16. The method of claim 14, further comprising:
receiving a request from the device of the customer to retrieve the additional information that is stored.

17. A non-transitory computer-readable medium storing instructions which, when executed by one or more processors, cause the one or more processors to perform operations for providing additional information, the operations comprising:

displaying a view of a product offered for sale at a venue while a mobile application of a device of a customer is in a camera mode;

receiving an identification code identifying the product over a communication network from the mobile application of the device of the customer, the identification code identifying the product while the mobile application of the device is in the camera mode;

obtaining social media information regarding the customer from a social network, wherein the social media information comprises an interest of the customer, wherein the interest of the customer is a hobby of the customer;

selecting the additional information of a feature of the product that is identified by the identification code based upon the hobby of the customer;

selecting a background environment based upon the hobby of the customer, wherein the background environment presents a theme based on the hobby of the customer, wherein the background environment is distinct from the view of the product offered for sale at the venue;

providing, over the communication network, the additional information of the feature of the product that is identified by the identification code and the background environment to the mobile application of the device of the customer to display the additional information of the feature of the product that is identified by the identification code on the background environment that is selected as at least a part of an augmented reality presentation by the mobile application of the device; and presenting, by the mobile application of the device, the augmented reality presentation that includes the additional information of the feature of the product that is identified by the identification code and the background information while the mobile application of the device is displaying the view of the product to tailor a shopping experience presented to the customer.

18. The non-transitory computer-readable medium of claim 17, wherein the additional information is selected based upon a customer segment in which the customer is placed based on the social media information.

19. A system for providing additional information, the system comprising:
a first processor of a retailer or a network provider; and
a first computer-readable medium storing first instructions which, when executed by the first processor, cause the first processor to perform first operations, the first operations comprising:
receiving an identification code identifying a product offered for sale at a venue, over a communication network from a mobile application of a device of a customer, the identification code identifying the product while the mobile application of the device is in a camera mode;
obtaining social media information regarding the customer from a social network, wherein the social media information comprises an interest of the customer, wherein the interest of the customer is a hobby of the customer;
selecting the additional information of a feature of the product that is identified by the identification code based upon the hobby of the customer;
selecting a background environment based upon the hobby of the customer, wherein the background environment presents a theme based on the hobby of the customer, wherein the background environment is distinct from a view of the product offered for sale at the venue;
providing over the communication network the additional information of the feature of the product that is identified by the identification code and the background environment to the mobile application of the device of the customer to display the additional information of the feature of the product that is identified by the identification code on the background environment that is selected as at least a part of an augmented reality presentation by the mobile application of the device; and
a second processor of the device of the customer; and
a second computer-readable medium storing second instructions which, when executed by the second processor, cause the second processor to perform second operations, the second operations comprising:
displaying the view of the product offered for sale at the venue while the mobile application is in a camera mode; and
presenting the augmented reality presentation that includes the additional information of the feature of the product that is identified by the identification code and the background information while the mobile application of the device is displaying the view of the product to tailor a shopping experience presented to the customer.

20. The system of claim 19, wherein the additional information is selected based upon a customer segment in which the customer is placed based on the social media information.

\* \* \* \* \*